US011788896B2

(12) United States Patent
Zhuang et al.

(10) Patent No.: US 11,788,896 B2
(45) Date of Patent: Oct. 17, 2023

(54) FOREHEAD THERMOMETER DISPLAYING DIFFERENT COLORS ACCORDING TO DETECTED TEMPERATURES AND CONTROL CIRCUIT THEREOF (71) Applicant: ZHEJIANG RONGSHENG TOOLS CO., LTD, Jinhua (CN)

(72) Inventors: Shijie Zhuang, Jinhua (CN); Zhiwei Zhuang, Jinhua (CN)

(73) Assignee: ZHEJIANG RONGSHENG TOOLS CO., LTD, Jinhua (CN)

( * ) Notice: Subject to any disclaimer, the term of this patent is extended or adjusted under 35 U.S.C. 154(b) by 390 days.

(21) Appl. No.: 17/101,435

(22) Filed: Nov. 23, 2020

(65) Prior Publication Data

US 2022/0011170 A1 Jan. 13, 2022

(30) Foreign Application Priority Data

Jul. 10, 2020 (CN) .......................... 202010664332.5

(51) Int. Cl.
G01K 1/00 (2006.01)
G01K 1/04 (2006.01)
(Continued)

(52) U.S. Cl.
CPC ............. *G01K 1/045* (2013.01); *G01K 1/028* (2013.01); *G09G 3/3607* (2013.01); *G09G 2320/0666* (2013.01)

(58) Field of Classification Search
CPC ...... G01K 1/045; G01K 1/028; G09G 3/3607; G09G 2320/0666; G01J 5/025;
(Continued)

(56) References Cited

U.S. PATENT DOCUMENTS

2002/0143257 A1* 10/2002 Newman ............... G01J 5/0205
374/E13.003
2007/0071066 A1* 3/2007 Weng ........................ G01J 5/02
374/163
(Continued)

OTHER PUBLICATIONS

Microchip PIC16LF1938, pp. 1-10 of 466. (Year: 2017).*
Extended European Search Report dated May 26, 2021 received in European Patent Application No. EP 20215116.3.

*Primary Examiner* — Lisa M Caputo
*Assistant Examiner* — Nasir U. Ahmed
(74) *Attorney, Agent, or Firm* — Scully, Scott, Murphy & Presser, P.C.

(57) ABSTRACT

The present disclosure provides a forehead thermometer that displays different colors according to detected temperatures and a control circuit thereof, which belong to the technical field of forehead thermometers. The forehead thermometer includes a forehead thermometer body, wherein the forehead thermometer body comprises a housing, an indicator light, a liquid crystal display (LCD) screen comprising a backlight board which is adapted to light up in different colors according to different detected temperatures. The LCD screen is disposed on an upper end face of the housing, and the indicator light is disposed on a side of the housing, and wherein the indicator light is a transparent light guide body capable of guiding light, and an outer end face of the indicator light is located outside the housing; and a light guide plate capable of guiding the light emitted from the backlight board to the indicator light is fixedly disposed in the housing.

5 Claims, 9 Drawing Sheets (51) Int. Cl.
*G01K 1/02* (2021.01)
*G09G 3/36* (2006.01)

(58) Field of Classification Search
CPC .......... G01J 5/0265; G01J 5/0025; G01J 5/12; G01J 2005/123
See application file for complete search history.

(56) References Cited

U.S. PATENT DOCUMENTS

| | | |
|---|---|---|
| 2008/0219318 A1 | 9/2008 | Yue |
| 2011/0194585 A1 | 8/2011 | Shrivastava |
| 2014/0003462 A1* | 1/2014 | Roth .................. G01K 13/20 374/E1.001 |
| 2015/0293180 A1* | 10/2015 | Dulle .................. H02J 7/0016 324/426 |
| 2016/0000331 A1 | 1/2016 | Khachaturian et al. |
| 2016/0282201 A1 | 9/2016 | Yildizyan et al. |

* cited by examiner

A: no welding
B: battery voltage detection
C: power supply enabled output
D: corrected PWM output
E: charging wake-up
F: green output
G: red output
H: white output

FOREHEAD THERMOMETER DISPLAYING DIFFERENT COLORS ACCORDING TO DETECTED TEMPERATURES AND CONTROL CIRCUIT THEREOF

TECHNICAL FIELD

The present disclosure belongs to the technical field of forehead thermometers, and specifically relates to a forehead thermometer that displays different colors according to detected temperatures, and a control circuit thereof.

BACKGROUND

At present, novel coronavirus pneumonia (COVID-19) is prevalent worldwide which infected more than 8 million people and lead to more than half a million people died. The clinical manifestations of the pneumonia patients with novel coronavirus infection are: fever, fatigue, dry cough as the main performance, nasal congestion, runny nose and other symptoms of upper respiratory tract are rare, will appear hypoxia. Body temperature detecting is a preliminary way to ascertain whether people are healthy or not. A forehead thermometer is a body temperature detection tool which has a low cost and which is quick in detecting. After the forehead thermometer is used to detect the body temperature, whether the body temperature of the detected person is normal can be known only by taking back the forehead thermometer and viewing an LCD screen of the forehead thermometer, so that the next detection can take place. In this case, an extra 2 seconds is required. In particular, for those taller than the measurement personnel, it takes a longer time; and for detection of a large number of people, the detection efficiency is low.

SUMMARY

In view of the drawback that the detection efficiency will be significantly reduced since the result is viewed after measurement in forehead thermometers in the prior art, the present disclosure provides a forehead thermometer that displays different colors according to detected temperatures and a control circuit thereof. The forehead thermometer is provided with an indicator light at a side, which can light up in different colors according to detected temperatures so that whether the body temperature of the detected person is normal can be judged by viewing the different colors of the indicator light from the side of the forehead thermometer, which can significantly improve the detection efficiency.

The object of the present disclosure is achieved through the following technical solutions: a forehead thermometer that displays different colors according to detected temperatures includes a forehead thermometer body, wherein the forehead thermometer body comprises a housing, an indicator light, a liquid crystal display (LCD) screen comprising a backlight board which is adapted to light up in different colors according to different detected temperatures, wherein the LCD screen is disposed on an upper end face of the housing, and the indicator light is disposed on a side of the housing, and wherein the indicator light is a transparent light guide body capable of guiding light, and an outer end face of the indicator light is located outside the housing; and a light guide plate capable of guiding the light emitted from the backlight board to the indicator light is fixedly disposed in the housing. The user can observe the indicator light from the side of the forehead thermometer, and judge whether the body temperature of the detected person is normal by viewing the color of the indicator light. There is no need to take back the forehead thermometer to view the LCD screen, so that the detection time is saved and the detection efficiency is improved.

Preferably, when the temperature detected by the forehead thermometer body is between 31.6° C. and 37.3° C. the indicator light will light up in green, indicating that the body temperature of the detected person is normal. When the temperature detected by the forehead thermometer body is between 37.4° C. and 38.0° C. the indicator light will light up in yellow, indicating that the body temperature of the detected person is high, and the detected person has a low fever. When the temperature detected by the forehead thermometer body is between 38.1° C. and 43.4° C. the indicator light will light up in red, indicating that the body temperature of the detected person is too high, and the detected person has a high fever. The three colors represent the three states of the body temperature of the detected person. The user can make a preliminary judgment based on the color of the indicator light, which can significantly improve the detection efficiency.

Preferably, the forehead thermometer body includes a body temperature detection probe, a circuit board assembly, a function key, and a lithium battery. The body temperature detection probe is fixedly disposed at a front end of the housing. The body temperature detection probe, the function key and the lithium battery are electrically connected to the circuit board assembly respectively. The circuit board assembly includes a main board, the LCD screen, and the backlight board capable of lighting up in different colors according to different temperatures detected by the body temperature detection probe. The backlight board with such an arrangement can also facilitate the user to view the detection result.

Preferably, the indicator light is a transparent light guide body capable of guiding light that does not actually emit light. The indicator light only displays the light emitted from the backlight board through the light guide plate. In fact, it is the backlight board that emits different lights according to different temperatures. This arrangement eliminates the need for the provision of an additional luminous body, thereby simplifying the circuit structure, reducing costs, and realizing the corresponding function.

Preferably, the indicator light is a first indicator light, the forehead thermometer further comprising a second indicator light, wherein the first indicator light and the second indicator light are respectively disposed on left and right sides of the housing, so that the indicator lights can be viewed from the left and right sides of the forehead thermometer, which is more convenient.

Preferably, the circuit board assembly includes a control circuit which includes a single-chip microcomputer main control and interface circuit, a liquid crystal displaying and driving circuit, a sensors and amplifying circuit, a lithium battery charging and charging wake-up circuit, and a power supply voltage regulating circuit, wherein the single-chip microcomputer main control and interface circuit includes a SCM chip, and the model of the SCM chip is PIC16LF1938-I-SS; the liquid crystal displaying and driving circuit includes an LCD screen and a liquid crystal dot matrix display driving chip, and the model of the liquid crystal dot matrix display driving chip is HT1621B-48; the No. 15 pin, No. 16 pin, No. 17 pin, and No. 18 pin of the single-chip microcomputer are respectively connected with the No. 9 pin, No. 10 pin, No. 11 pin and No. 12 pin of the liquid crystal dot matrix display driving chip; the No. 1 pin to No. 8 pin of the liquid crystal dot matrix display driving chip are respectively connected with the No. 8 pin to No. 1 pin of the LCD screen; the No. 21 pin to No. 24 pin of the liquid crystal dot matrix display driving chip are respectively connected with the No. 13 pin to No. 16 pin of the LCD screen; and the No. 45 pin to No. 48 pin of the liquid crystal dot matrix display driving chip are respectively connected with the No. 12 pin to No. 9 pin of the LCD screen; the LCD screen also includes a backlight board which is driven by a backlight plug-in 1; the No. 2 terminal of the backlight plug-in 1 is connected with the No. 25 terminal of the single-chip microcomputer, the No. 3 terminal of the backlight plug-in 1 is connected with the No. 26 terminal of the single-chip microcomputer, and the No. 4 terminal of the backlight plug-in 1 is connected with the No. 23 terminal of the single-chip microcomputer; the sensors and amplifying circuit includes an infrared receiver IR1, a thermopile sensor, and a zero-drift operational amplifier TP5552; the infrared receiver IR1 is connected with the No. 2 pin of the single-chip microcomputer, the GND terminal of the thermopile sensor is connected with the No. 3 pin of the single-chip microcomputer after rectification and filtration, the TP+ and TP− terminals of the thermopile sensor are respectively connected with the No. 3 pin and No. 2 pin of the zero-drift operational amplifier TP5552 after rectification and filtration, and the No. 1 pin of the zero-drift operational amplifier TP5552 is connected in parallel with the No. 2 pin of the single-chip microcontroller after rectification and filtration; the No. 28 pin of the single-chip microcontroller is also connected with a power supply on/off key S1, the No. 22 pin of the single chip microcomputer is also connected with a temperature Celsius/Fahrenheit switch key S2, and the No. 23 pin of the single-chip microcomputer is also connected with a detection execution key S3.

In the above solution, when the detection execution key S3 is pressed, the sensor executes detections of target temperature and ambient temperature. The sensor includes infrared detection and thermistor detection. In the infrared detection, the target temperature is detected through the infrared receiver IR1. A thermistor of the thermopile sensor detects the ambient temperature. The value of the ambient temperature detected by the thermistor of the sensor is directly transmitted to the single-chip microcomputer. The value of the target temperature detected by the infrared detection is first amplified by the zero-drift operational amplifier, and then rectified and filtered before being transmitted to the single-chip microcomputer. After the processing and calculation by the single-chip microcomputer, the value is transmitted to the liquid crystal displaying and driving circuit, and the value of the detected temperature is displayed on the LCD screen. The displayed value of temperature can be switched to being displayed in Celsius or Fahrenheit through the switch key S2. The No. 2 terminal of the backlight plug-in 1 corresponds to red backlight of the backlight board, the No. 3 terminal of the backlight plug-in 1 corresponds to green backlight of the backlight board, and the No. 4 terminal of the backlight plug-in 1 corresponds to white backlight of the backlight board. When the value of the detected target temperature is displayed on the LCD screen after the calculation and comparison by the single-chip microcomputer, and at the same time if the detected temperature is 31.6° C.-37.3° C. or 88.9° F.-99.1° F., the green backlight of the backlight board will light up; if the detected temperature is 37.4° C.-38.0° C. or 99.3° F.-100.4° F., the red and green backlights of the backlight board will light up at the same time, exhibiting a yellow color; and if the detected temperature is 38.1° C.-43.4° C. or 100.6° F.-110.1° F., the red backlight of the backlight board will light up. When the forehead thermometer is standing by or an error message prompt is displayed on the LCD screen, the white backlight of the backlight board will light up.

As compared with the prior art, the present disclosure has the following advantageous effects: the forehead thermometer is easy to observe, and the detection result can be preliminarily known by simply viewing the color of the indicator light on the side of the forehead thermometer, so that the detection efficiency can be significantly improved.

Reference signs in the drawings: 1. forehead thermometer body; 2. housing; 3. body temperature detection probe; 4. circuit board assembly; 5. function key; 6. lithium battery; 7. main board; 8. LCD display; 9. backlight board; 10. indicator light; 11. light guide plate.

DETAILED DESCRIPTION

The present disclosure will be further described below in conjunction with the embodiments shown in the drawings:

First Embodiment

As shown in FIGS. 1-5, a forehead thermometer that displays different colors according to detected temperatures includes a forehead thermometer body 1, which includes a housing 2, a body temperature detection probe 3, a circuit board assembly 4, a function key 5, and a lithium battery 6. The body temperature detection probe 3 is fixedly disposed at a front end of the housing 2. The body temperature detection probe 3, the function key 5 and the lithium battery 6 are electrically connected to the circuit board assembly 4 respectively. The circuit board assembly 4 includes a main board 7, an LCD screen 8, and a backlight board 9 that can light up in different colors according to different temperatures detected by the body temperature detection probe 3. The LCD screen 8 is disposed on an upper end face of the housing 2. Left and right sides of the housing 2 are each provided with one indicator light 10 which is a transparent light guide body capable of guiding light, and an outer end face of the indicator light 10 is located outside the housing 2. A light guide plate 11 that can guide the light emitted from the backlight board 9 to the indicator light 10 is fixedly disposed in the housing 2. The indicator light 10 can be used to display the color of the light of the backlight board 9.

Figure 1:
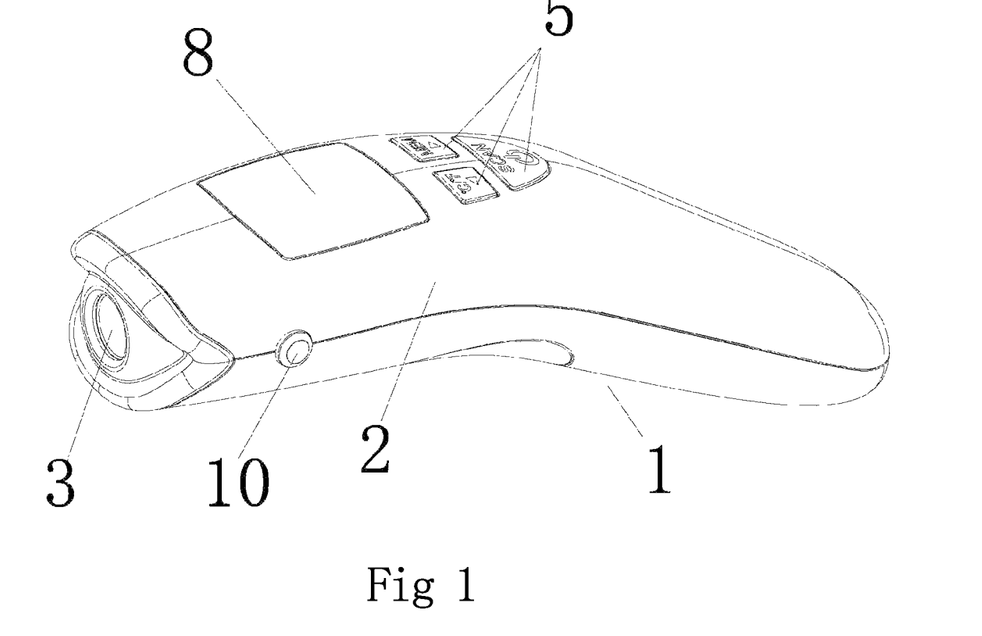
FIG. 1 is a perspective view of the present disclosure.
Figure 2:
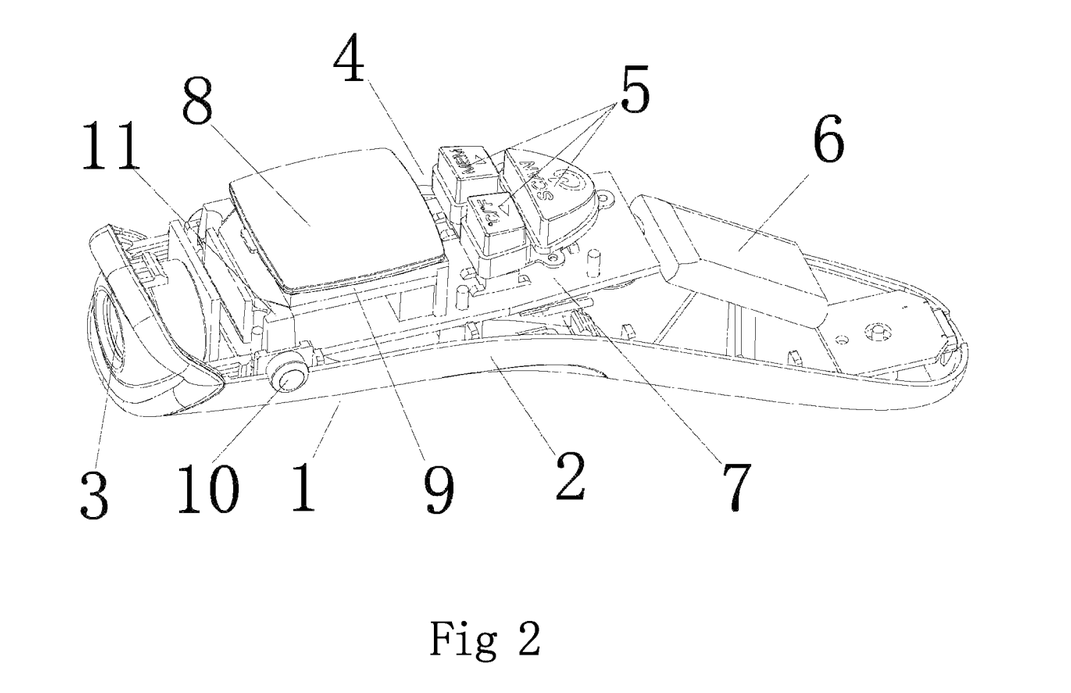
FIG. 2 is a schematic structural view of the present disclosure after a housing is partially removed.
Figure 3:
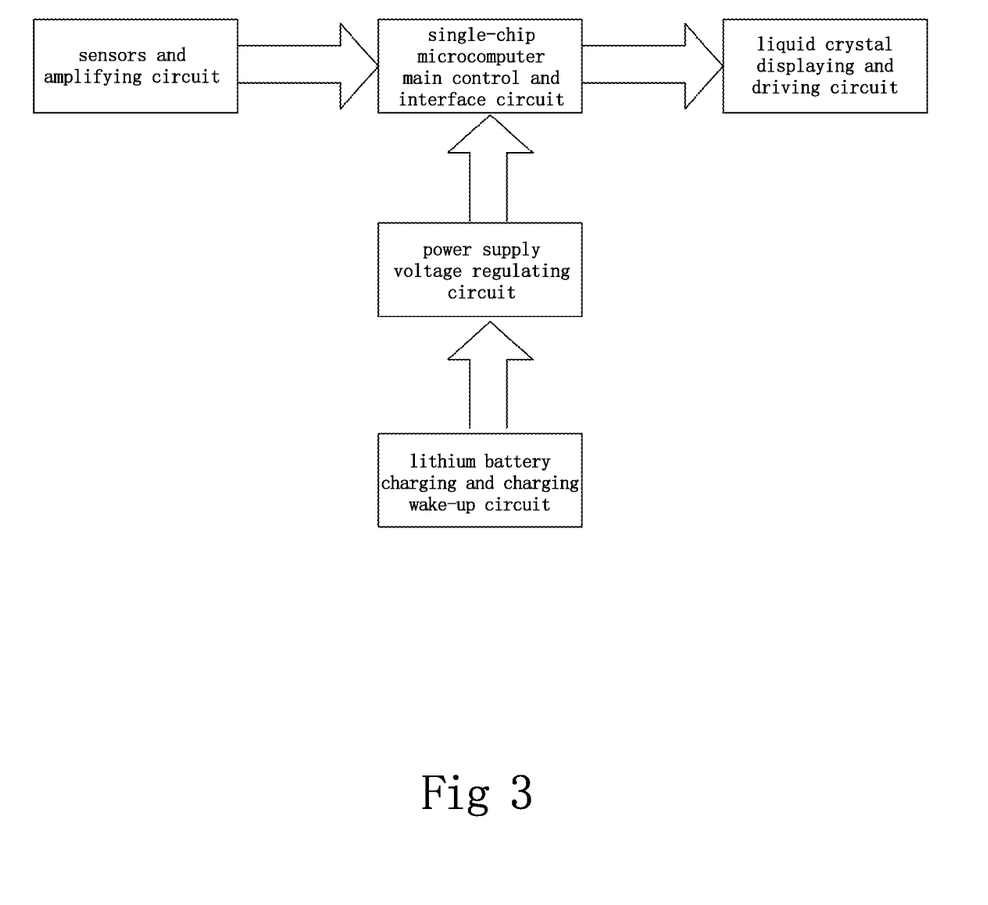
FIG. 3 is a block diagram of the circuit principle of the present disclosure.
Figure 4A:
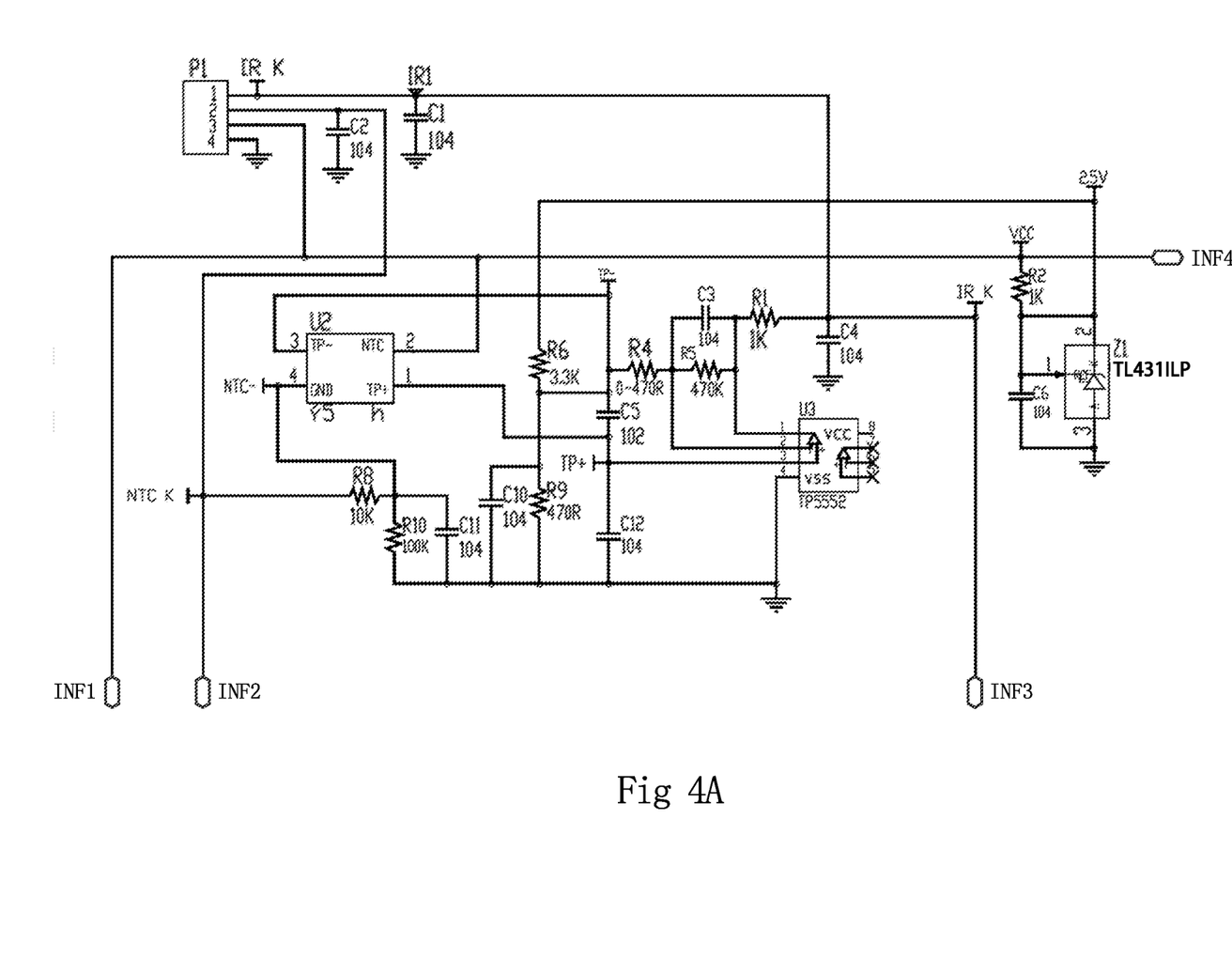
FIG. 4A, FIG. 4B, FIG. 4C and FIG. 4D collectively illustrate a structural view of the circuit principle of the present disclosure.
Figure 4B:
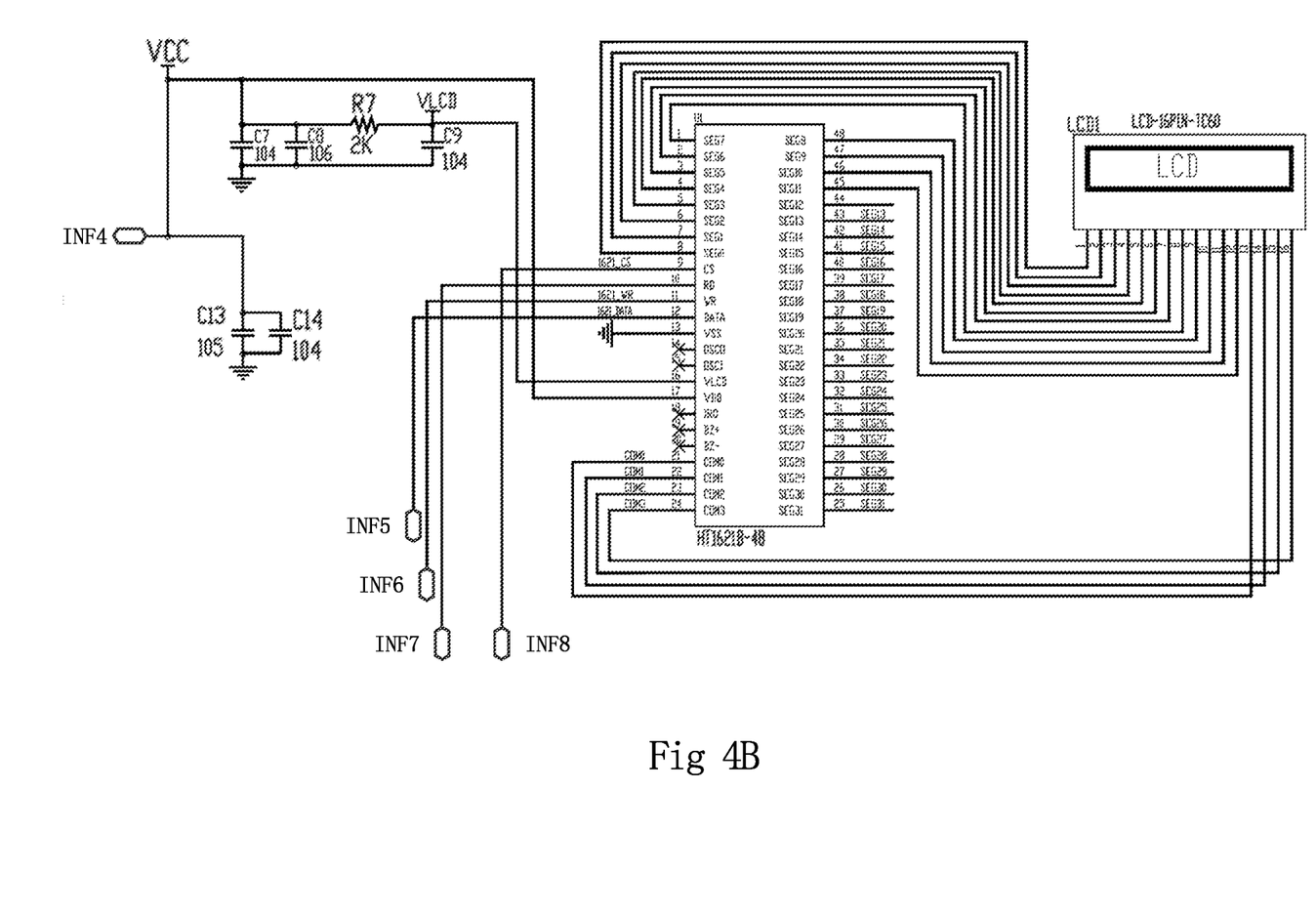
Figure 4C:
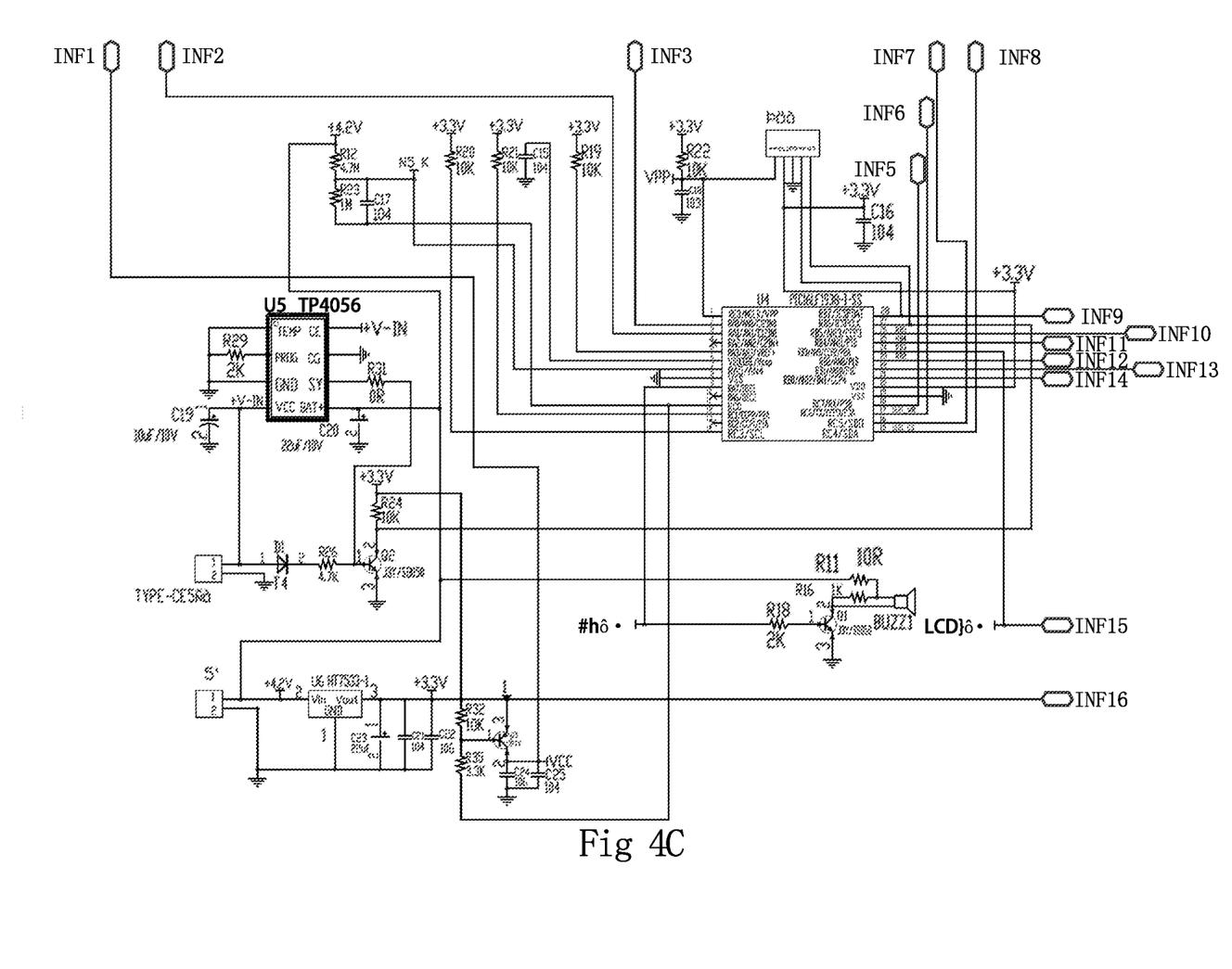
Figure 4D:
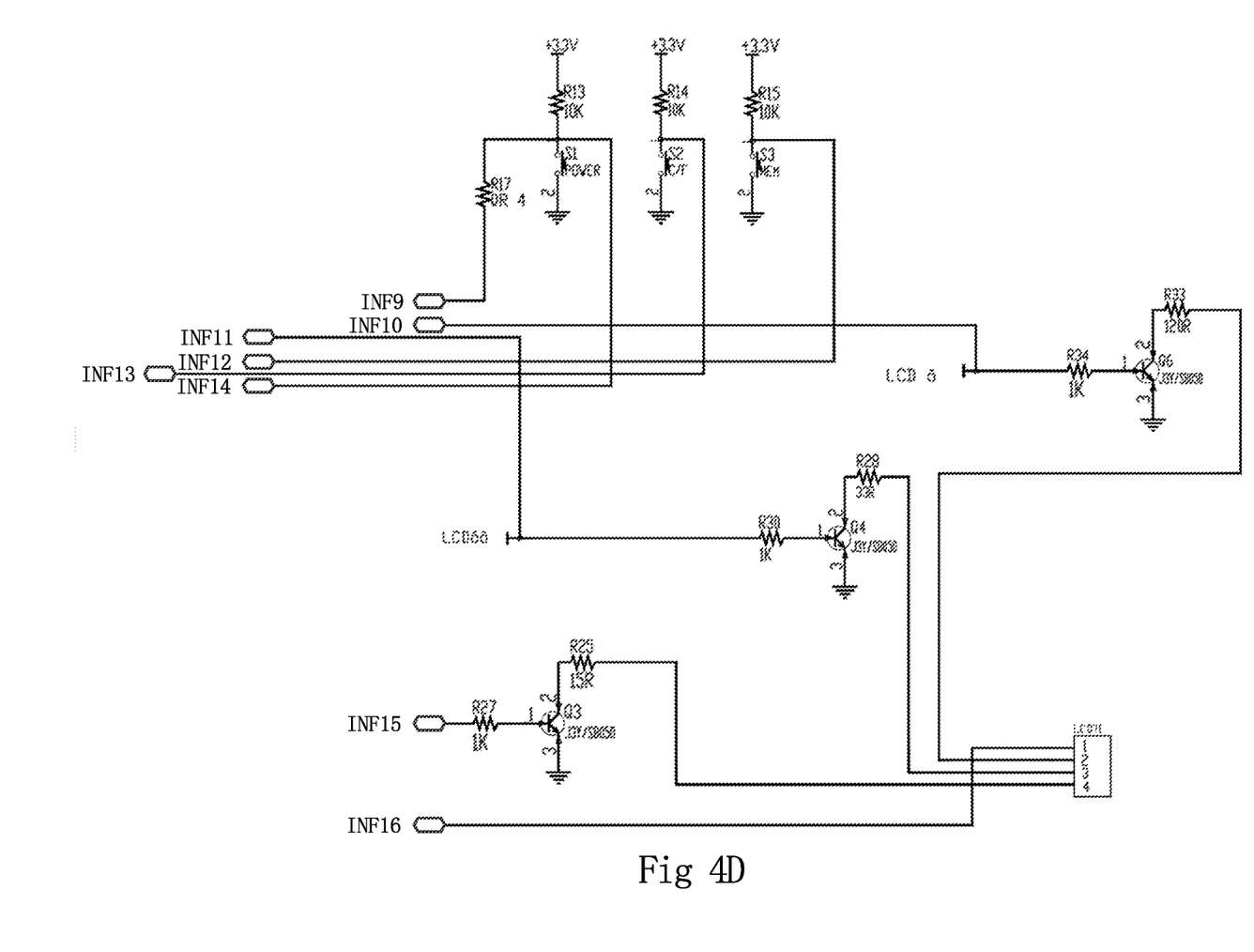
Figure 5:
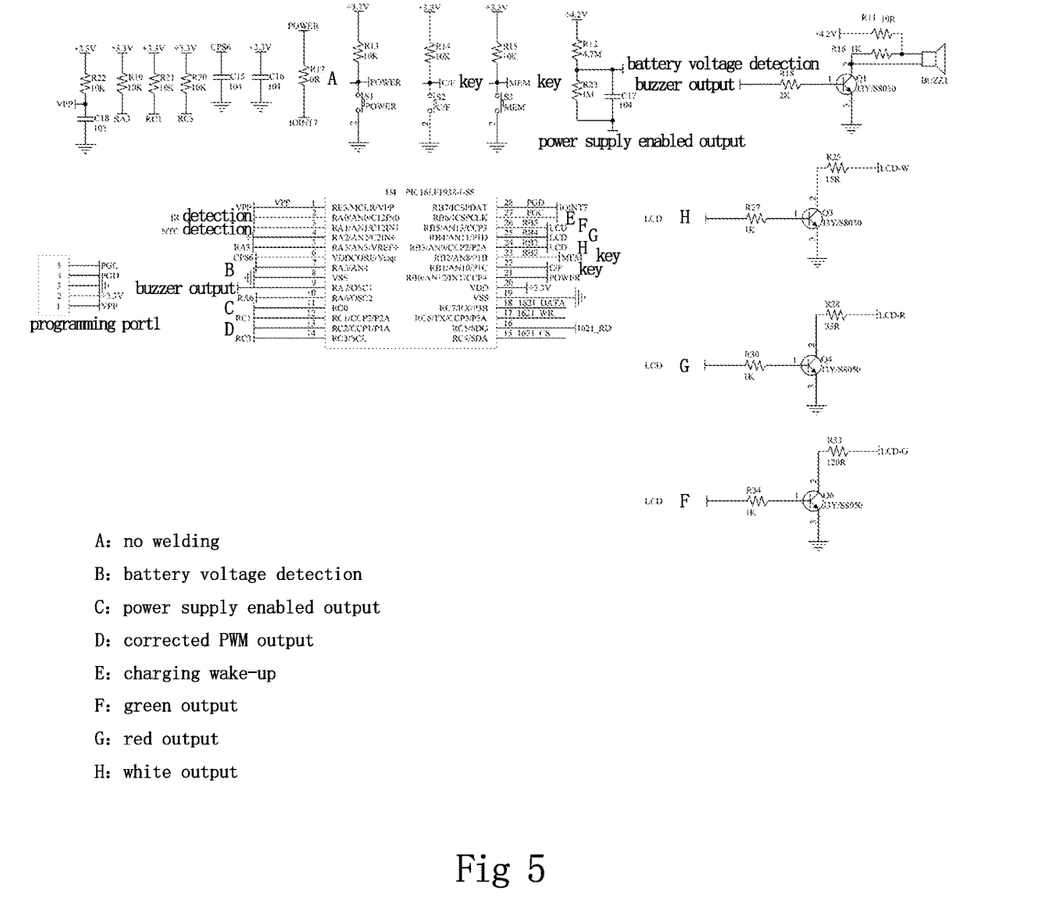
FIG. 5 is a structural view of the circuit principle of a single-chip microcomputer main control and interface circuit of the present disclosure.
Figure 6:
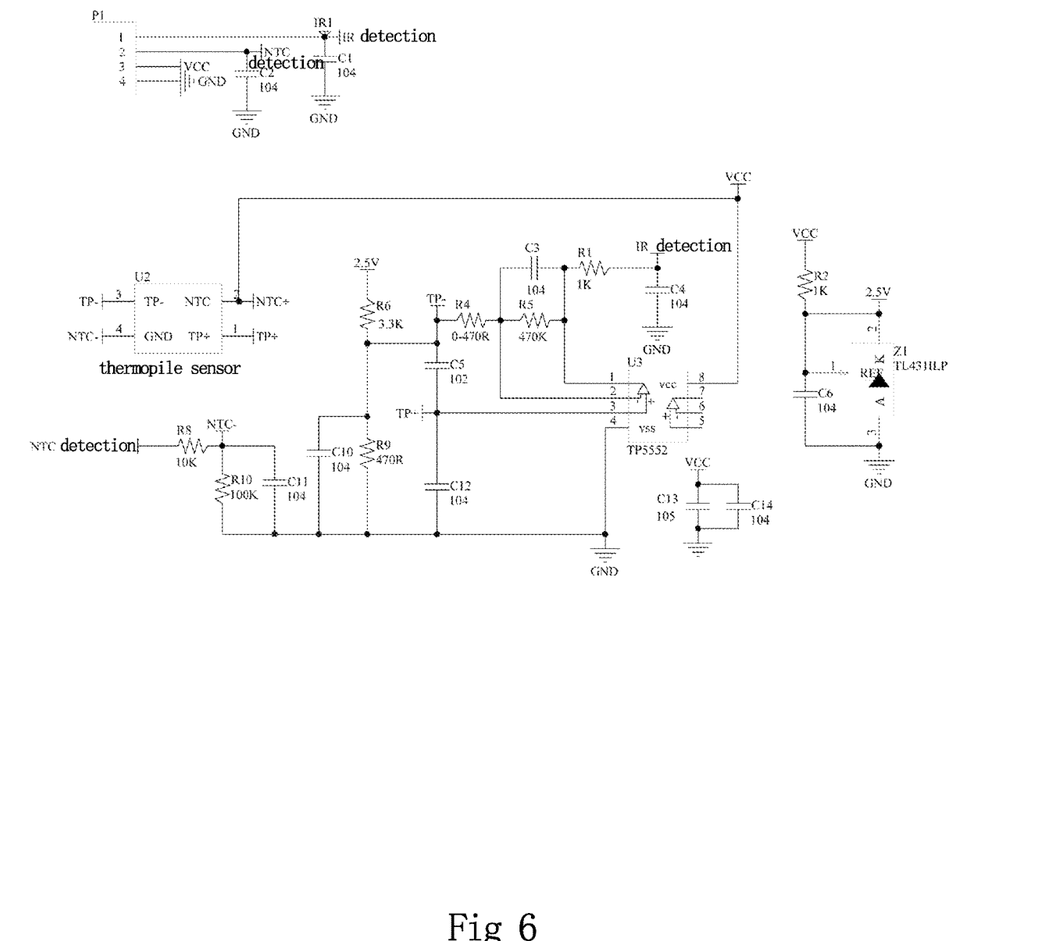
FIG. 6 is a structural view of the circuit principle of a sensors and amplifying circuit of the present disclosure.
Figure 7:
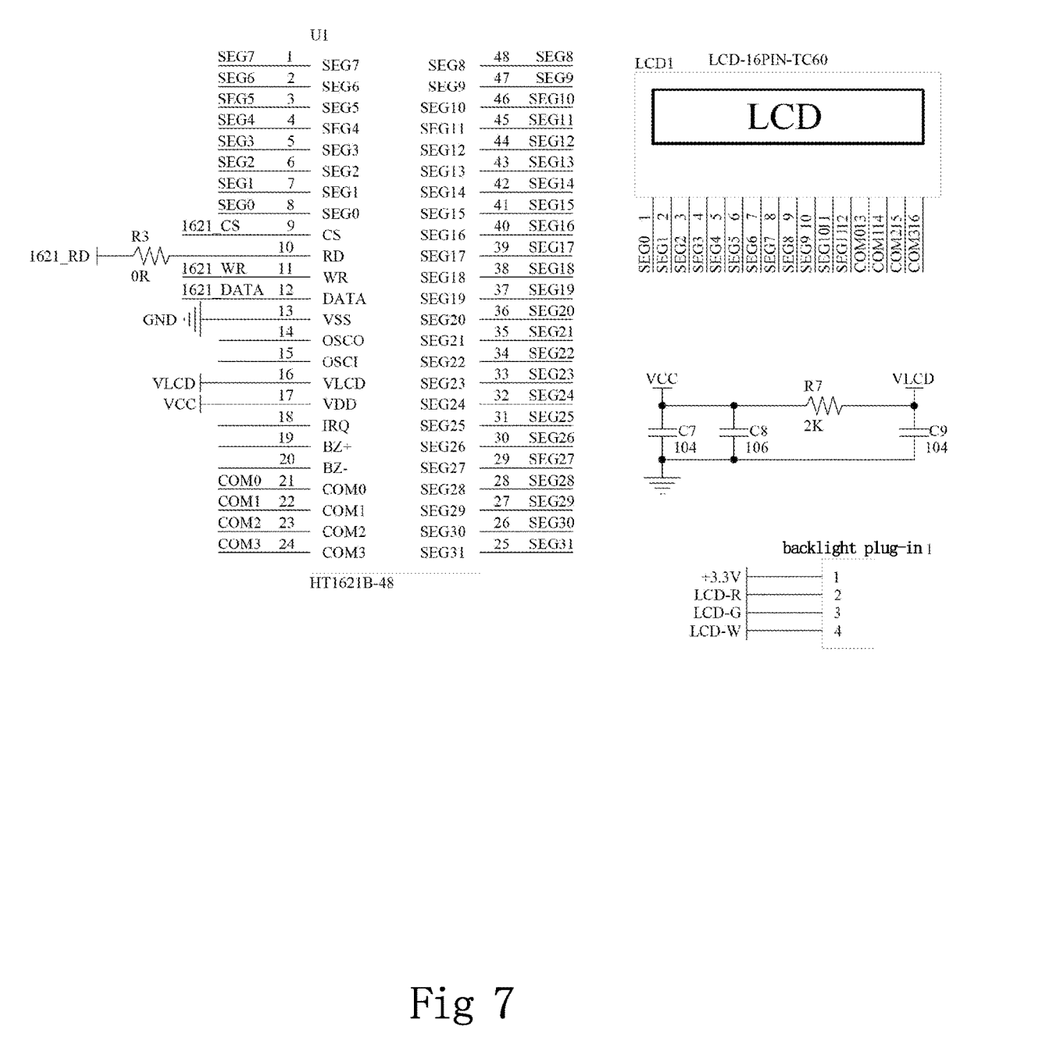
FIG. 7 is a structural view of the circuit principle of a liquid crystal displaying and driving circuit of the present disclosure.

The forehead thermometer can be used to detect body temperature through the body temperature detection probe 3. The body temperature detection probe 3 is a thermopile sensor. The main board 7 on the circuit board assembly 4 is provided with a single-chip microcomputer, which has information and signal processing functions. Infrared rays emitted from human body is received, converted into a temperature value by the circuit board assembly 4 and displayed on the LCD screen 8. After the processing by the circuit board assembly 4, the backlight board 9 displays lights of different colors according to different measurement results.

When the temperature detected by the forehead thermometer body 1 is 31.6° C.-37.3° C. or 88.9° F.-99.1° F., the backlight board 9 will light up in green; at this point, the LCD screen 8 and the indicator lights 10 will also light up in green, indicating that the body temperature of the detected person is normal. When the temperature detected by the forehead thermometer body 1 is 37.4° C.-38.0° C. or 99.3° F.-100.4° F., the backlight board 9 will light up in yellow; at this point, the LCD screen 8 and the indicator lights 10 will also light up in yellow, indicating that the body temperature of the detected person is high, and the detected person has a low fever. When the temperature detected by the forehead thermometer body 1 is 38.1° C.-43.4° C. or 100.6° F.-110.1° F., the backlight board 9 will light up in red; at this point, the LCD screen 8 and the indicator lights 10 will also light up in red. When the forehead thermometer is standing by or an error message prompt is displayed on the LCD screen 8, the backlight board 9 will light up in white. The display mode of the forehead thermometer is negative display, that is, the background color of the LCD screen 8 is black, and the color displayed when the LCD screen 8 is lit up is the color of the light on the backlight board 9; when the color of the light changes, the lights of different colors are guided to the outside through the light guide plate 11 and the indicator light 10, making it convenient for observation. Whether the body temperature is normal, or the detected person has a low fever or a high fever can be judged without directly reading the temperature value on the LCD screen 8. The detection efficiency can be significantly improved. The housing 2 of the forehead thermometer body 1 has a bionic structure as a whole, similar to the shape of a catfish. The positions of the two indicator lights 10 are the eyes of the bionic structure. When the light is on, the whole body is more agile.

A control circuit for a forehead thermometer that displays different colors according to detected temperatures is provided. The control circuit includes a single-chip microcomputer main control and interface circuit, a liquid crystal displaying and driving circuit, a sensors and amplifying circuit, a lithium battery charging and charging wake-up circuit, and a power supply voltage regulating circuit, wherein the single-chip microcomputer main control and interface circuit includes a SCM chip, and the model of the SCM chip is PIC16LF1938-I-SS; the liquid crystal displaying and driving circuit includes an LCD screen and a liquid crystal dot matrix display driving chip, and the model of the liquid crystal dot matrix display driving chip is HT1621B-48; the No. 15 pin, No. 16 pin, No. 17 pin, and No. 18 pin of the single-chip microcomputer are respectively connected with the No. 9 pin, No. 10 pin, No. 11 pin and No. 12 pin of the liquid crystal dot matrix display driving chip; the No. 1 pin to No. 8 pin of the liquid crystal dot matrix display driving chip are respectively connected with the No. 8 pin to No. 1 pin of the LCD screen; the No. 21 pin to No. 24 pin of the liquid crystal dot matrix display driving chip are respectively connected with the No. 13 pin to No. 16 pin of the LCD screen; and the No. 45 pin to No. 48 pin of the liquid crystal dot matrix display driving chip are respectively connected with the No. 12 pin to No. 9 pin of the LCD screen; the LCD screen also includes a backlight board which is driven by a backlight plug-in 1; the No. 2 terminal of the backlight plug-in 1 is connected with the No. 25 terminal of the single-chip microcomputer, the No. 3 terminal of the backlight plug-in 1 is connected with the No. 26 terminal of the single-chip microcomputer, and the No. 4 terminal of the backlight plug-in 1 is connected with the No. 23 terminal of the single-chip microcomputer; the sensors and amplifying circuit includes an infrared receiver IR1, a thermopile sensor, and a zero-drift operational amplifier TP5552; the infrared receiver IR1 is connected with the No. 2 pin of the single-chip microcomputer, the GND terminal of the thermopile sensor is connected with the No. 3 pin of the single-chip microcomputer after rectification and filtration, the TP+ and TP− terminals of the thermopile sensor are respectively connected with the No. 3 pin and No. 2 pin of the zero-drift operational amplifier TP5552 after rectification and filtration, and the No. 1 pin of the zero-drift operational amplifier TP5552 is connected in parallel with the No. 2 pin of the single-chip microcontroller after rectification and filtration; the No. 28 pin of the single-chip microcontroller is also connected with a power supply on/off key S1, the No. 22 pin of the single chip microcomputer is also connected with a temperature Celsius/Fahrenheit switch key S2, and the No. 23 pin of the single-chip microcomputer is also connected with a detection execution key S3.

The specific embodiments described herein are merely examples to illustrate the spirit of the present disclosure. Those skilled in the art to which the present disclosure belongs can make various modifications or additions to the described specific embodiments or replace them by similar alternatives, which will not deviate from the spirit of the present disclosure or go beyond the scope defined by the appended claims.

The invention claimed is:

1. A forehead thermometer that displays different colors according to detected temperatures, comprising
 a forehead thermometer body, wherein the forehead thermometer body comprises a housing, an indicator light, a liquid crystal display (LCD) screen comprising a backlight board which is adapted to light up in different colors according to different detected temperatures,
 wherein the LCD screen is disposed on an upper end face of the housing, and the indicator light is disposed on a side of the housing, and
 wherein the indicator light is a transparent light guide body capable of guiding light, and an outer end face of the indicator light is located outside the housing; and a light guide plate capable of guiding the light emitted from the backlight board to the indicator light is fixedly disposed in the housing.

2. The forehead thermometer that displays different colors according to detected temperatures according to claim 1,
 wherein when the temperature detected by the forehead thermometer body is between 31.6° C. and 37.3° C. the indicator light will light up in green,
 wherein when the temperature detected by the forehead thermometer body is between 37.4° C. and 38.0° C. the indicator light will light up in yellow, and
 wherein when the temperature detected by the forehead thermometer body is between 38.1° C. and 43.4° C. the indicator light will light up in red.

3. The forehead thermometer that displays different colors according to detected temperatures according to claim 1, wherein:
 the forehead thermometer body comprises a body temperature detection probe, a circuit board assembly, a function key, and a lithium battery;

the body temperature detection probe is fixedly disposed at a front end of the housing;

the body temperature detection probe, the function key and the lithium battery are electrically connected to the circuit board assembly respectively; and the circuit board assembly comprises a main board, the LCD screen, and the backlight board capable of lighting up in different colors according to different temperatures detected by the body temperature detection probe.

4. The forehead thermometer that displays different colors according to detected temperatures according to claim 3, wherein the indicator light is a first indicator light, the forehead thermometer further comprising a second indicator light, wherein the first indicator light and the second indicator light are respectively disposed on left and right sides of the housing.

5. The forehead thermometer that displays different colors according to detected temperatures according to claim 3, wherein the circuit board assembly comprises a control circuit which comprises a single-chip microcomputer main control and interface circuit, a liquid crystal displaying and driving circuit, a sensors and amplifying circuit, a lithium battery charging and charging wake-up circuit, and a power supply voltage regulating circuit;

the single-chip microcomputer main control and interface circuit comprises a SCM chip, and a model of the SCM chip is PIC16LF1938-I-SS;

the liquid crystal displaying and driving circuit comprises an LCD screen and a liquid crystal dot matrix display driving chip, and a model of the liquid crystal dot matrix display driving chip is HT1621B-48;

the No. 15 pin, No. 16 pin, No. 17 pin, and No. 18 pin of the single-chip microcomputer are respectively connected with the No. 9 pin, No. 10 pin, No. 11 pin and No. 12 pin of the liquid crystal dot matrix display driving chip;

the No. 1 pin to No. 8 pin of the liquid crystal dot matrix display driving chip are respectively connected with the No. 8 pin to No. 1 pin of the LCD screen;

the No. 21 pin to No. 24 pin of the liquid crystal dot matrix display driving chip are respectively connected with the No. 13 pin to No. 16 pin of the LCD screen;

the No. 45 pin to No. 48 pin of the liquid crystal dot matrix display driving chip are respectively connected with the No. 12 pin to No. 9 pin of the LCD screen;

the LCD screen also comprises a backlight board which is driven by a backlight plug-in 1;

the No. 2 terminal of the backlight plug-in 1 is connected with the No. 25 terminal of the single-chip microcomputer, the No. 3 terminal of the backlight plug-in 1 is connected with the No. 26 terminal of the single-chip microcomputer, and the No. 4 terminal of the backlight plug-in 1 is connected with the No. 23 terminal of the single-chip microcomputer;

the sensors and amplifying circuit comprises an infrared receiver IR1, a thermopile sensor, and a zero-drift operational amplifier TP5552;

the infrared receiver IR1 is connected with the No. 2 pin of the single-chip microcomputer, the GND terminal of the thermopile sensor is connected with the No. 3 pin of the single-chip microcomputer after rectification and filtration, the TP+ and TP− terminals of the thermopile sensor are respectively connected with the No. 3 pin and No. 2 pin of the zero-drift operational amplifier TP5552 after rectification and filtration, and the No. 1 pin of the zero-drift operational amplifier TP5552 is connected in parallel with the No. 2 pin of the single-chip microcontroller after rectification and filtration; and the No. 28 pin of the single-chip microcontroller is also connected with a power supply on/off key S1, the No. 22 pin of the single chip microcomputer is also connected with a temperature Celsius/Fahrenheit switch key S2, and the No. 23 pin of the single-chip microcomputer is also connected with a detection execution key S3.

* * * * *